United States Patent
Zhao et al.

(10) Patent No.: US 9,350,167 B2
(45) Date of Patent: May 24, 2016

(54) ELECTRONIC DEVICE, POWER SUPPLY CONTROL CHIP AND POWER SUPPLY CONTROL METHOD

(75) Inventors: Shuangcheng Zhao, Beijing (CN); Xiaoren Cheng, Beijing (CN)

(73) Assignees: Lenovo (Beijing) Limited, Beijing (CN); Beijing Lenovo Software Ltd., Beijing (CN)

( * ) Notice: Subject to any disclaimer, the term of this patent is extended or adjusted under 35 U.S.C. 154(b) by 403 days.

(21) Appl. No.: 14/002,652

(22) PCT Filed: Dec. 28, 2011

(86) PCT No.: PCT/CN2011/084837
§ 371 (c)(1),
(2), (4) Date: Aug. 30, 2013

(87) PCT Pub. No.: WO2012/119476
PCT Pub. Date: Sep. 13, 2012

(65) Prior Publication Data
US 2013/0334882 A1    Dec. 19, 2013

(30) Foreign Application Priority Data

Mar. 7, 2011   (CN) .......................... 2011 1 0053771

(51) Int. Cl.
*H02J 7/00*    (2006.01)
*H02J 1/00*    (2006.01)
*H02J 7/34*    (2006.01)

(52) U.S. Cl.
CPC ... *H02J 1/00* (2013.01); *H02J 7/34* (2013.01); *Y10T 307/344* (2015.04)

(58) Field of Classification Search
USPC .......................................................... 320/107
See application file for complete search history.

(56) References Cited
U.S. PATENT DOCUMENTS

2004/0075418 A1    4/2004    Densham et al.

2012/0025767 A1 *   2/2012    Cha .......................... G06F 1/26
                                                           320/111

FOREIGN PATENT DOCUMENTS

| CN | 1248385 C   | 9/2004 |
| CN | 200941561 Y | 8/2007 |
| CN | 101051752 A | 10/2007 |
| CN | 101944758 A | 1/2011 |

OTHER PUBLICATIONS

International Search Report, PCT/CN2011/084837.

* cited by examiner

*Primary Examiner* — Robert Grant
(74) *Attorney, Agent, or Firm* — Kinney & Lange, P.A.

(57) ABSTRACT

The present invention provides an electronic device, a power supply control chip and a power supply control method. The electronic device includes: at least one element (10); a rechargeable battery (12); an adapter socket (14); a first processing circuit (16) having a first operation state and a second operation state; a power supply judgment parameter acquisition module (18) configured to acquire a power supply judgment parameter; and a control module (20) configured to control the first processing circuit to operate in the first or second operation state based on the power supply judgment parameter. In the first operation state, the first processing circuit (16) is configured to convert a first electrical signal output from a adapter into a second electrical signal and charge the rechargeable battery (12) with the second electrical signal. In the second operation state, the first processing circuit (16) is configured to convert a third electrical signal output from the rechargeable battery (12) into a fourth electrical signal and supply power to the at least one element (10) with the fourth electrical signal. With the electronic device, the power supply control chip and the power supply control method according to the present invention, utilization of the rechargeable battery (12) can be improved.

12 Claims, 5 Drawing Sheets

ELECTRONIC DEVICE, POWER SUPPLY CONTROL CHIP AND POWER SUPPLY CONTROL METHOD

TECHNICAL FIELD

The present invention relates to power supply technology for electronic devices, and more particularly, to electronic devices, power supply control chips and power supply control methods.

BACKGROUND

In order for an electronic device such as a PAD to be compatible with a 5V Universal Serial Bus (USB) power supply and DC conversion efficiency, the existing PAD devices are provided with a 5V adapter. However, the voltage output from a rechargeable battery of one string of cells is not constant, but may have a discharge voltage from 4.2V to 3.3V, for example. Therefore, to charge a rechargeable battery, a voltage provided by the adapter needs to be stepped down by a buck circuit before it is used to charge the rechargeable battery. Also, when the rechargeable battery is discharged to supply power to other electronic elements of the device, the voltage provided by the rechargeable battery needs to be stepped down and/or up by a buck circuit and/or a boost circuit before supplying power to the electronic elements (e.g., a 3V battery output can be stepped up to 3.3V or 5V, or stepped down to 1.8V, for power supply).

For an electronic device using a rechargeable battery, how long the battery can continuously provide power is a major concern of the user. However, during the voltage conversion process, the step up conversion results in a larger energy loss than the step down conversion. Thus, the utilization of the battery is degraded and the user requirement cannot be met.

Meanwhile, at least two converters are required for charging/power supplying of the rechargeable battery. They occupy a large space, which is undesired for miniaturization of portable devices such as PADs.

SUMMARY

Embodiments of the present invention provide an electronic device, a power supply control chip and a power supply control method, capable of improving the performance of a rechargeable battery.

According to an embodiment of the present invention, an electronic device is provided. The electronic device includes: a main board; at least one element connected to the main board; a rechargeable battery; an adapter socket electrically connected to the at least one element; a first processing circuit having a first terminal electrically connected to the rechargeable battery and a second terminal electrically connected to the adapter socket and the at least one element, the first processing circuit having a first operation state and a second operation state; a power supply judgment parameter acquisition module configured to acquire a power supply judgment parameter; and a control module configured to control the first processing circuit to operate in the first or second operation state based on the power supply judgment parameter. In the first operation state, the first processing circuit is configured to convert a first electrical signal output from a adapter connected to the adapter socket into a second electrical signal and charge the rechargeable battery with the second electrical signal, while the adapter supplies power to the at least one element with the first electrical signal. In the second operation state, the first processing circuit is configured to convert a third electrical signal output from the rechargeable battery into a fourth electrical signal and supply power to the at least one element with the fourth electrical signal.

In the electronic device, the control module is configured to control the first processing circuit to operate in the first operation state when the power supply judgment parameter indicates that the adapter supplies power and the rechargeable battery needs to be charged, and to control the first processing circuit to operate in the second operation state when the power supply judgment parameter indicates that the rechargeable battery supplies power.

In the electronic device, the adapter is further configured to provide a fifth electrical signal having a voltage higher than that of the first electrical signal. The first processing circuit further has a third operation state, and operates in the third operation state when the adapter provides the fifth electrical signal. In the third operation state, the first processing circuit is configured to convert the fifth electrical signal output from the adapter into the second electrical signal and charge the rechargeable battery with the second electrical signal, and the adapter supplies power to the at least one element with the fifth electrical signal.

In the electronic device, the control module is configured to control the first processing circuit to operate in the first or third operation state based on the voltage of the electrical signal provided by the adapter when the power supply judgment parameter indicates that the adapter supplies power and the rechargeable battery needs to be charged, and to control the first processing circuit to operate in the second operation state when the power supply judgment parameter indicates that the rechargeable battery supplies power.

In the electronic device, the voltage of the first electrical signal is the same as that of the fourth electrical signal.

In the electronic device, the voltage of the fourth electrical signal is higher than a discharging voltage of the rechargeable battery.

In the electronic device, the voltage of the first electrical signal is lower than an upper limit of a charging voltage of the rechargeable battery.

In the electronic device, the voltage of the fourth electrical signal is a first voltage, and the at least one element includes a first element operating at a second voltage different from the first voltage. The electronic device further includes: a first voltage conversion module configured to convert the electrical signal output from the adapter or the fourth electrical signal into a sixth electrical signal having the second voltage, the first voltage conversion module having a first terminal connected to the second terminal of the first processing circuit and the adapter socket, and a second terminal connected to the first element.

In the electronic device, the voltage of the fourth electrical signal is a first voltage and the at least one element includes a first element operating at a second voltage different from the first voltage. The electronic device further includes: a second voltage conversion module configured to convert the electrical signal output from the adapter or the third electrical signal into a sixth electrical signal having the second voltage, the second voltage conversion module having a first terminal connected to the rechargeable battery and the adapter socket, and as second terminal connected to the first element.

In the electronic device, the first processing circuit includes: a first resistor, an inductor, a diode, a capacitor and a second resistor sequentially connected in series, the first resistor being electrically connected to a line connected with an anode of the adapter, the second resistor being electrically connected to a line connected with a cathode of the adapter, and a series circuit of the capacitor and the second resistor being connected in parallel with the rechargeable battery; and a field effect transistor (FET) having a drain connected between the inductor and the diode and a source connected to the second resistor and electrically connected to the line connected with the cathode of the adapter. The control module is connected to the gate and the source of the FET and configured to control an operation parameter of the FET, such that the first processing circuit converts the first electrical signal output from the adapter or the third electrical signal output from the rechargeable battery.

In the electronic device, the first processing circuit further has a fourth operation state. The control module is further configured to control the first processing circuit to operate in the fourth operation state when the power supply judgment parameter indicates that the adapter supplies power and the electronic device has a load exceeding a predetermined threshold. In the fourth operation state, the first processing circuit is configured to convert the third electrical signal output from the rechargeable battery into the fourth electrical signal and supply power to the at least one element with the fourth electrical signal in cooperation with the electrical signal provided by the adapter.

According to another embodiment of the present invention, a power supply control chip is provided. The power supply control chip is used in an electronic device provided with a first processing circuit and a rechargeable battery. The power supply control chip includes: a parameter collection module configured to collect a power supply state of an adapter and a voltage of the rechargeable battery; and a control module configured to control the first processing circuit to operate in a first operation state or a second operation state based on the power supply state of the adapter and the voltage of the rechargeable battery. In the first operation state, the first processing circuit is configured to convert a first electrical signal output from the adapter into a second electrical signal and charge the rechargeable battery with the second electrical signal, and the adapter supplies power to at least one element with the first electrical signal. In the second operation state, the first processing circuit is configured to convert a third electrical signal output from the rechargeable battery into a fourth electrical signal and supply power to the at least one element with the fourth electrical signal.

According to yet another embodiment of the present invention, a power supply control method is provided. The method is implemented in an electronic device provided with a first processing circuit and a rechargeable battery. The method includes: collecting a power supply state of an adapter and a voltage of the rechargeable battery; and controlling the first processing circuit to operate in a first operation state or a second operation state based on the power supply state of the adapter and the voltage of the rechargeable battery. In the first operation state, the first processing circuit is configured to convert a first electrical signal output from the adapter into a second electrical signal and charge the rechargeable battery with the second electrical signal, and the adapter supplies power to at least one element with the first electrical signal. In the second operation state, the first processing circuit is configured to convert a third electrical signal output from the rechargeable battery into a fourth electrical signal and supply power to the at least one element with the fourth electrical signal.

In the electronic device, the power supply control chip and the power supply control method according to the embodiments of the present invention, the first processing circuit is provided, and the charging and power supplying management of the rechargeable battery can be achieved by controlling the operation state of the first processing circuit. In this way, the limited space in PCB layout can be saved.

In the electronic device, the power supply control chip and the power supply control method according to the embodiments of the present invention, the first processing circuit steps up the output signal from the rechargeable battery before it is used to charge the element. In this way, the utilization of the rechargeable battery can be improved.

In the electronic device, the power supply control chip and the power supply control method according to the embodiments of the present invention, when the voltage of the electrical signal provided by the adapter equals to the voltage obtained by converting the electrical signal of the rechargeable battery at the first processing circuit, the charging and power supplying management of the rechargeable battery can be achieved with a single circuit. In this way, the limited space in PCB layout can be saved.

In the electronic device, the power supply control chip and the power supply control method according to the embodiments of the present invention, the first processing circuit further has a third operation state, such that it can be adapted to different voltages of the electrical signals provided by the adapter. In this way, the adaptation capability of the electronic device can be further enhanced.

In the electronic device, the power supply control chip and the power supply control method according to the embodiments of the present invention, when the system load is too high for the adapter alone to supply power to satisfy the system requirement, the first processing circuit converts the electrical signal output from the rechargeable battery for supplying power to the system along with the adapter. In this way, the system requirement can be satisfied, and the normal operation of the electronic device can be guaranteed.

DETAILED DESCRIPTION OF THE EMBODIMENTS

In the electronic device, the power supply control chip and the power supply control method according to the embodiments of the present invention, a processing circuit is provided for connecting an adapter and an electronic element to be powered, to improve utilization of the rechargeable battery.

Figure 1:
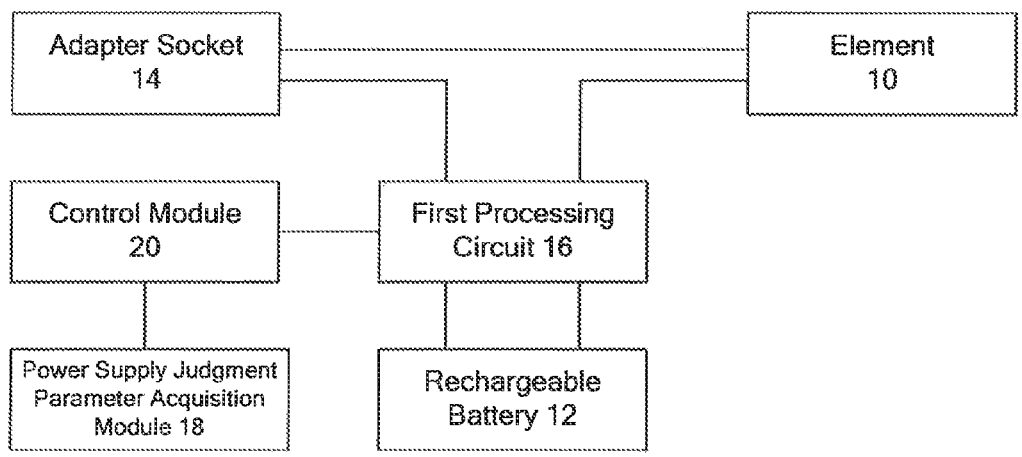
FIG. 1 is a schematic block diagram of an electronic device according to an embodiment of the present invention.

As shown in FIG. 1, an electronic device according to an embodiment of the present invention includes: a main board (not shown); at least one element 10 connected to the main board; a rechargeable battery 12; an adapter socket 14 electrically connected to the at least one element 10; a first processing circuit 16 having a first terminal electrically connected to the rechargeable battery 12 and a second terminal electrically connected to the adapter socket 14 and the at least one element 10, the first processing circuit 16 having a first operation state and a second operation state; a power supply judgment parameter acquisition module 18 configured to acquire a power supply judgment parameter; and a control module 20 configured to control the first processing circuit 16 to operate in the first or second operation state based on the power supply judgment parameter.

In the first operation state, the first processing circuit 16 is configured to convert a first electrical signal output from an adapter connected to the adapter socket 14 into a second electrical signal and charge the rechargeable battery 12 with the resulting second electrical signal, and the adapter supplies power to the at least one element 10 with the first electrical signal.

In the second operation state, the first processing circuit 16 is configured to convert a third electrical signal discharged from the rechargeable battery 12 into a fourth electrical signal, and supply power to the at least one element 10 with the resulting fourth electrical signal.

The operation process of the electronic device will be described in the following with reference to its structure as shown in FIG. 1.

The first processing circuit 10 has two operation states. The first processing circuit 16 operates in the first operation state, when the output terminal of the adapter is connected to the adapter socket and the adapter supplies power to the electronic device. The electrical signal provided by the adapter is split into two branches by the adapter socket 14. A first branch of electrical signal is output to the element 10 for supplying power to the element 10, while a second branch of electrical signal is output to the first processing circuit 16. When the rechargeable battery 12 needs to be charged, the first processing circuit 16 converts the voltage of the electrical signal output from the adapter and charges the rechargeable battery 12 with the converted electrical signal.

The first processing circuit 16 operates in the second operation state, when the output terminal of the adapter is disconnected from the adapter socket 14 and the rechargeable battery 12 supplies power. In this case, the output voltage of the rechargeable battery 12 is generally different from the operating voltage of the element 10. Thus, the first processing circuit 16 converts the voltage of the electrical signal output from the rechargeable battery 12, and supplies power to the element 10 with the converted electrical signal.

The first processing circuit 16 operates in either the first operation state or the second operation state. Its operation state is decided and controlled by the control module 20. In particular, the power supply judgment parameter acquisition module 18 acquires a power supply judgment parameter (the details on how to acquire the power supply control parameter and which parameter to be acquired will be explained later) and sends it to the control module 20, such that the control module 20 can decide the operation state of the first processing circuit 16.

In an embodiment of the present invention, the power supply judgment parameter can include a voltage across the adapter socket 14, and a voltage of the rechargeable battery 12.

When the voltage across the adapter socket 14 is higher than a first predetermined value, and the current voltage of the rechargeable battery 12 is lower than a second predetermined value (e.g., the second predetermined value can be a voltage value when the remaining power level of the rechargeable battery exceeds a predetermined percentage (e.g., 95%, which can be selected as desired) of the full power level), it is indicated that the adapter is supplying power and the rechargeable battery 12 needs to be charged. In this case, the first processing circuit 16 is controlled to operate in the first operation state to convert a first electrical signal provided by the adapter into a second electrical signal and charge the rechargeable battery 12 with the converted second electrical signal.

When the voltage across the adapter socket 14 is lower than a third predetermined value (which can be smaller than the first predetermined value), it is indicated that the adapter cannot supply power. In this case, the first processing circuit 16 is controlled to operate in the second operation state to convert a third electrical signal output from the rechargeable battery 12 into a fourth electrical signal and supply power to the element 10 with the converted fourth electrical signal.

The voltage of the rechargeable battery 12 can be acquired by reading data from a built-in chip within the rechargeable battery 12. For example, existing mobile phones, notebook computers, PDAs and the like are capable of displaying their remaining battery power level, which is acquired by reading data from built-in chips within their rechargeable batteries. Thus, further details of acquiring the voltage of the rechargeable battery will be omitted.

The voltage across the adapter socket can be acquired in a typical design of electronic circuit and the details thereof will also be omitted here.

In the electronic device according to the embodiment of the present invention, the first processing circuit 16 can operate in either of the two operation states, so as to achieve the charging and power supplying functions in the electronic device. The first processing circuit 16 can be implemented in a single chip, which reduces the space occupied by the chip when compared with the prior art where two converter chips are required.

In an embodiment of the present invention, in order to increase a duration for which the rechargeable battery can continuously provide power, the discharging voltage of the rechargeable battery 12 (i.e., the voltage of the third electrical signal) can be lower than the voltage of the fourth electrical signal.

In other words, the rechargeable battery is discharged to supply power in a voltage step-down manner, which has a lower power loss than a case that the rechargeable battery is discharged to supply power in a voltage step-up manner. In this way, utilization of the rechargeable battery can be improved.

In general, currently many electronic devices are equipped with 5V adapters in order to be compatible with the USB 5V power supply mechanism. That is, the voltages of the first and the fourth electrical signals are both 5V. In order to achieve the step-down power supply, in an embodiment of the present invention, the rechargeable battery 12 can include two or more strings of cells.

In this case, in the embodiment of the present invention, the voltage of the electrical signal provided by the adapter (i.e., the first electrical signal) may be lower than an upper limit of a charging voltage of the rechargeable battery 12.

In an embodiment of the present invention, if the voltage of the first electrical signal equals to the voltage of the fourth electrical signal, the first processing circuit 16 converts the electrical signal provided by the adapter into a charging electrical signal for charging the rechargeable battery when the adapter is connected and the rechargeable battery needs to be charged, or converts the electrical signal output from the rechargeable battery for supplying power to the element when the adapter to is disconnected. Since the voltage of the first electrical signal equals to the voltage of the fourth electrical signal, a single circuit can be used to provide these signals, thereby saving the space occupied by the chip. In the following, the implementation of the first processing circuit 16 will be explained in detail.

Figure 2:
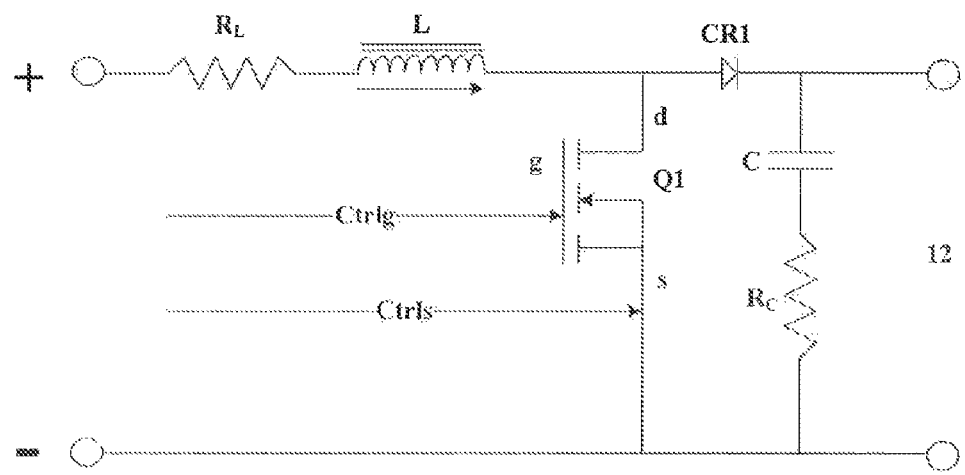
FIG. 2 is a schematic block diagram of a first processing circuit.

As shown in FIG. 2, the first processing circuit 16 includes a first resistor $R_L$, an is inductor L, a diode CR1, a capacitor C and a second resistor $R_C$ sequentially connected in series. The first resistor $R_L$ is electrically connected to a line connected with an anode (+) of the adapter. The second resistor $R_C$ is electrically connected to a line connected with a cathode (-) of the adapter. A series circuit of the capacitor C and the second resistor $R_C$ is connected in parallel with the rechargeable battery 12.

The first processing circuit 16 further includes a field effect transistor (FET) Q1 having its drain d connected between the inductor L and the diode CR1, and its source s connected to the second resistor $R_C$ and electrically connected to the line connected with the cathode (-) of the adapter.

The FET Q1 can be a depletion type FET or any other type of transistor. The present invention is not limited thereto. The control module 20 is connected to the gate g and the source s of the FET Q1, and configured to provide respective control signals Ctrlg and Ctrls to control an operation parameter of the FET Q1, such that the first processing circuit 16 converts the first electrical signal output from the adapter or the third electrical signal output from the rechargeable battery 12. For example, when the control module 20 detects that the rechargeable battery 12 is disconnected (e.g., removed), or that the adapted is plugged into the adapter socket 14 and the rechargeable battery 12 is fully charged, the control module 20 can control the signals Ctrlg and Ctrls to be at a low level in order to turn off the transistor Q1. In this case, the adapter supplies power. When the control module 20 detects that the adapter is plugged into the adapter socket 14 and the rechargeable battery 12 is not fully charged, the control module 20 can control the signals Ctrlg and Ctrls to be preset Pulse Width Modulation (PWM) signals, such that the adapter supplies power to the element and charges the rechargeable battery 12 (e.g., boost charging). When the control module 20 detects that the rechargeable battery is connected and the adapter is disconnected, the control module 20 can control the signals Ctrlg and Ctrls to be other preset PWM signals, such that the circuit operates in the buck discharging state in which the signal output from the rechargeable battery is converted for supplying power to the element.

The above structure is illustrative only and does not imply that the above functions can only be implemented with the structure shown in FIG. 2.

With continuous development of portable electronic devices, there are now electronic devices powered via a dock. In this case, the voltage of the electrical signal provided by the adapter (i.e., the fifth electrical signal) is higher than that of the first electrical signal. In this case, according to an embodiment of the present invention, the first processing circuit further has a third operation state.

The first processing circuit operates in the third operation state when the adapter provides the fifth electrical signal.

In the third operation state, the first processing circuit is configured to convert the fifth electrical signal output from the adapter into the second electrical signal and charge the rechargeable battery with the second electrical signal, and the adapter supplies power to elements with the fifth electrical signal.

Figure 3:
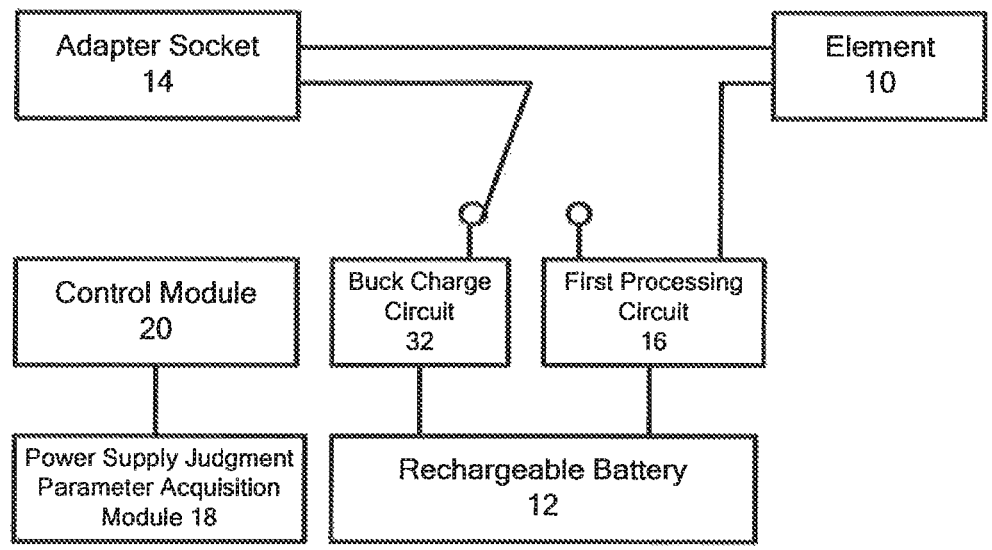
FIG. 3 is a schematic block diagram of the first processing circuit when the adapter provides electrical signals having different voltages.

In an embodiment of the present invention, the third operation state of the first processing circuit can be implemented by incorporating an additional buck charging circuit 32 to the structure of FIG. 2, as shown in FIG. 3. The control module 20 controls the first processing circuit 16 to operate in the first or third operation state based on the voltage of the electrical signal provided by the adapter, when the power supply judgment parameter indicates that the adapter supplies power and the rechargeable battery 12 needs to be charged. The control module 20 also controls the first processing circuit 16 to operate in the second operation state when the power supply judgment parameter indicates that the rechargeable battery 12 supplies power.

When the buck charging circuit 32 is incorporated, a single pole double throw (SPDT) switch can be provided. When the adapter supplies power with the first electrical signal, the switch connects the adapter socket 14 and the first processing circuit 16. When the adapter supplies power with the fifth electrical signal, the switch connects the adapter socket 14 and the incorporated buck charging circuit 32. The buck charging circuit 32 can be designed in accordance with any of conventional charging circuit designs, and the details thereof will be omitted here.

When the power supply judgment parameter indicates that the rechargeable battery 12 supplies power, the first processing circuit 16 is directly controlled to operate in the second operation state as described above.

Alternatively, in an embodiment of the present invention, the third operation state of the first processing circuit 16 can be implemented by using a single circuit. That is, the buck charging circuit 32 and the first processing circuit 16 can be integrated together.

Figure 4:
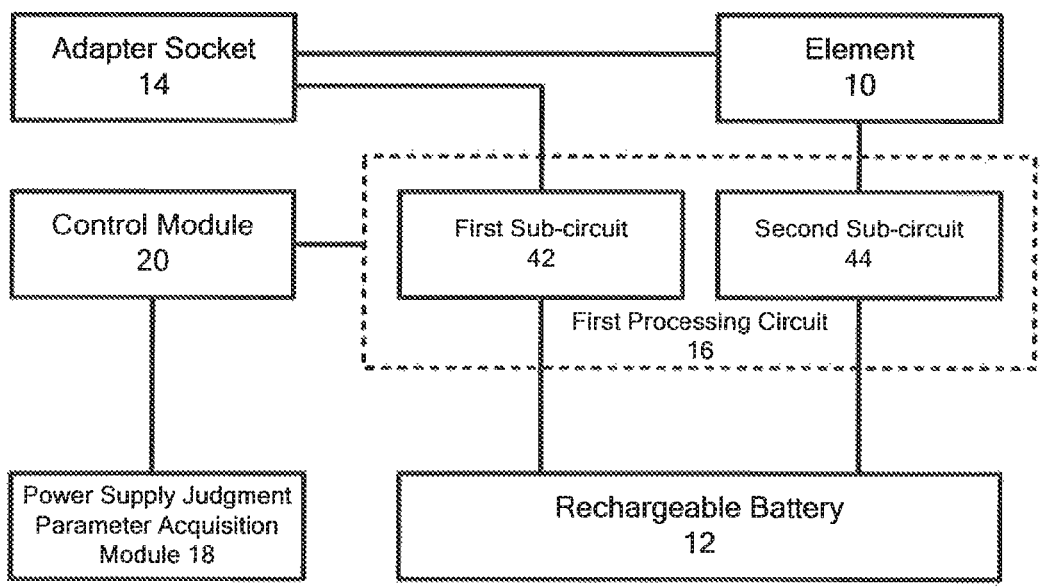
FIG. 4 is another schematic block diagram of the first processing circuit when the adapter provides electrical signals having different voltages.

It is well known that a voltage conversion circuit is capable of converting different voltages of electrical signals into one same voltage. In an embodiment of the present invention, if the voltage output from the adapter is within a range, the first processing circuit 16 can include at least two sub-circuits independent of each other. FIG. 4 shows the arrangement in which the first processing circuit 16 includes two sub-circuits.

A first sub-circuit 42 converts the first or the fifth electrical signal into the second electrical signal.

A second sub-circuit 44 converts the third electrical signal output from the first processing circuit 16 to the rechargeable battery 12 into the fourth electrical signal, and uses the converted fourth electrical signal to power the element 10.

When the first processing circuit 16 operates in the first or the third operation state, the first sub-circuit 42 is controlled to be active and the second sub-circuit 44 is controlled to be inactive. When the first processing circuit 16 operates in the second operation state, the first sub-circuit 42 is controlled to be inactive and the second sub-circuit 44 is controlled to be active.

Various elements in the electronic device have their respective operation voltages which may be different from each other. For example, in some electronic device, a backlight unit has an operation voltage of 5V, an Embedded Controller (EC) and a display each have an operation voltage of 3.3V, and a DDR3 memory has an operation voltage of 1.8V. In this case, the voltage of the electrical signal output from the first processing circuit may not provide operation voltages for all the elements. Thus, a voltage conversion module is needed. In the embodiments of the present invention, such voltage conversion can be implemented in the following two ways.

Implementation I

Figure 5:
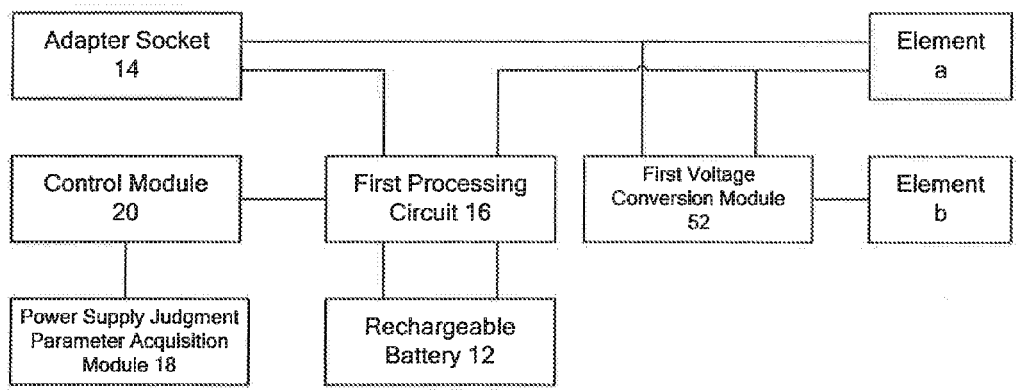
FIGS. 5 and 6 are schematic block diagrams of two implementations of the electronic device including a voltage conversion module, respectively.
Figure 6:
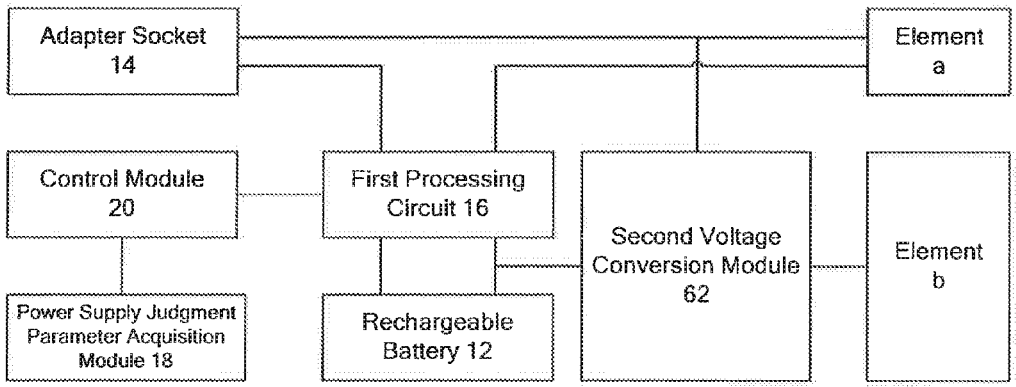

As shown in FIG. 5, the voltage of the fourth electrical signal is a first voltage, and the element 10 includes an element a operating at the first voltage and an element b operating at a second voltage different from the first voltage. The electronic device further includes a first voltage conversion module 52 configured to convert the electrical signal output from the adapter or the fourth electrical signal into a sixth electrical signal having the second voltage. The first voltage conversion module has a first terminal connected to the second terminal of the first processing circuit 16 and the adapter socket 14, and a second terminal connected to the element b.

When the rechargeable battery 12 supplies power to the element b, the electrical signal output from the rechargeable battery 12 is subjected to two conversions before being used to supply power to the element b.

Implementation II

However, since each conversion, either buck or boost, is accompanied with energy loss. Thus, in an embodiment of the present invention, the voltage of the fourth electrical signal is a first voltage, and the element 10 includes an element a operating at the first voltage and an element b operating at a second voltage different from the first voltage. The electronic device further includes a second to voltage conversion module 62 configured to convert the electrical signal output from the adapter or the third electrical signal into a sixth electrical signal having the second voltage. The second voltage conversion module 62 has a first terminal connected to the rechargeable battery 12 and the adapter socket 14, and a second terminal connected to the element b.

When the rechargeable battery 12 supplies power to the element b, the electrical signal output from the rechargeable battery 12 is subjected to only one conversion before being used to supply power to the element b.

Since the voltage of the electrical signal provided by the adapter is different from the voltage of the rechargeable battery, the second voltage conversion module should be capable of converting electrical signals having at least two different voltages into electrical signals having the same voltage. This can be done by using a conventional voltage converter, and thus the details will be omitted here.

When the load of the electronic device is relatively high (e.g., when it is executing a test task requiring a large amount of computation), it might be impossible for the adapter alone to supply power that satisfies the power consumption requirements of the system. In order to solve this problem, in an embodiment of the present invention, the first processing circuit further has a fourth operation state. The control module 20 controls the first processing circuit 16 to operate in the fourth operation state when the power supply judgment parameter indicates that the adapter supplies power and the electronic device has a load exceeding a predetermined threshold.

Figure 7:
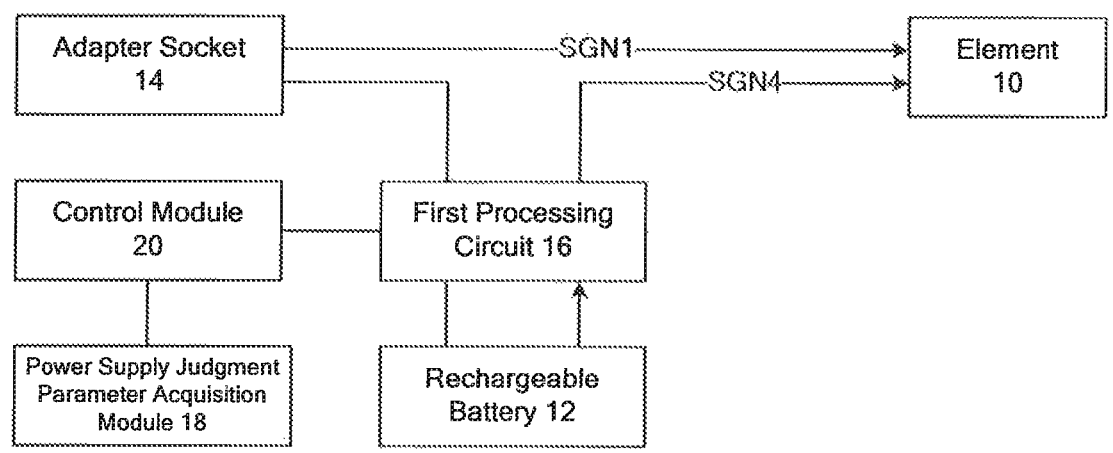
FIG. 7 is a schematic diagram showing electrical signal flows when the adapter and the rechargeable battery supply power together.

As shown in FIG. 7, in the fourth operation state, the first processing circuit 16 converts the third electrical signal output from the rechargeable battery 12 into the fourth electrical signal, and supplies power to the element 10 with both the resulting fourth electrical signal and the electrical signal provided by the adapter in cooperation. As shown in the figure, both the first electrical signal SGN1 and the fourth electrical signal SGN4 are output to the element 10 for supplying power to the element 10.

With the above solution, it is possible to guarantee the normal operation of the system even in case of a high load.

According to an embodiment of the present invention, a power supply control chip is provided. The power supply control chip is used in an electronic device provided with a first processing circuit and a rechargeable battery. The power is supply control chip includes: a parameter collection module configured to collect a power supply state of an adapter and a voltage of the rechargeable battery; and a control module configured to control the first processing circuit to operate in a first operation state or a second operation state based on the power supply state of the adapter and the voltage of the rechargeable battery. In the first operation state, the first processing circuit is configured to convert a first electrical signal output from the adapter into a second electrical signal and charge the rechargeable battery with the second electrical signal, and the adapter supplies power to at least one element with the first electrical signal. In the second operation state, the first processing circuit is configured to convert a third electrical signal output from the rechargeable battery into a fourth electrical signal and supply power to the at least one element with the fourth electrical signal.

According to an embodiment of the present invention, a power supply control method is provided. The method is implemented in an electronic device provided with a first processing circuit and a rechargeable battery. The method includes: collecting a power supply state of an adapter and a voltage of the rechargeable battery; and controlling the first processing circuit to operate in a first operation state or a second operation state based on the power supply state of the adapter and the voltage of the rechargeable battery. In the first operation state, the first processing circuit is configured to convert a first electrical signal output from the adapter into a second electrical signal and charge the rechargeable battery with the second electrical signal, and the adapter supplies power to at least one element with the first electrical signal. In the second operation state, the first processing circuit is configured to convert a third electrical signal output from the rechargeable battery into a fourth electrical signal and supply power to the at least one element with the fourth electrical signal.

Figure 8:
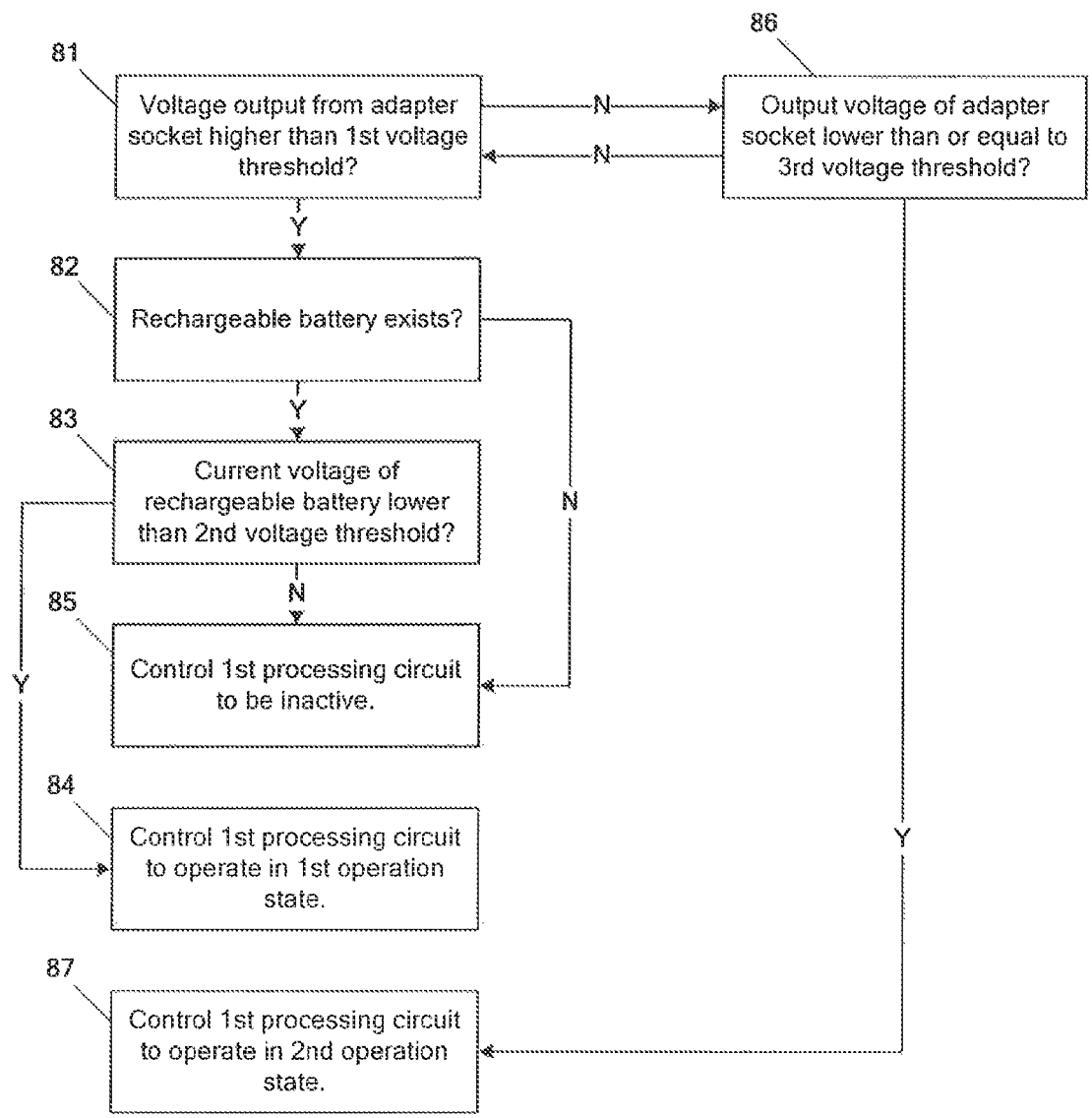
FIG. 8 is a schematic flowchart illustrating a process of controlling the operation state of the first processing circuit based on the power supply state of the adapter and the voltage of the rechargeable battery.

In the embodiment of the present invention, the process of controlling the first processing circuit to operate in a first operation state or a second operation state based on the power supply state of the adapter and the voltage of the rechargeable battery includes the following steps as shown in FIG. 8.

At step 81, it is determined whether the voltage output from the adapter socket is higher than a first voltage threshold (which can be a voltage value detected across the adapter socket when the adapter is actually plugged into the adapter socket). If so, the process proceeds with step 82; otherwise it proceeds with step 86.

At step 82, it is determined whether the rechargeable battery is present or not. If so, the process proceeds with step 83; otherwise it proceeds with step 85.

At step 83, it is determined whether the current voltage of the rechargeable battery is lower than a second voltage threshold (which can be set to a voltage value when the remaining power level of the rechargeable battery exceeds a predetermined percentage (e.g., 95%, which can be selected as desired) of the full power level). If so, the process proceeds with step 84; otherwise it proceeds with step 85.

At step 84, the first processing circuit is controlled to operate in the first operation state. In this case, the adapter supplies power to the element, and the first processing circuit converts the electrical signal provided by the adapter and charges the rechargeable battery with the converted electrical signal.

At step 85, the first processing circuit is controlled to be inactive.

At step 86, it is determined whether the output voltage of the adapter socket is lower than or equal to a third voltage threshold (which can be a voltage value detected across the adapter socket when the adapter is plugged out of the adapter socket, and which can be stored in the control module of the electronic device). If so, the process proceeds with step 87; otherwise it proceeds with step 81.

At step 87, the first processing circuit is controlled to operate in the second operation state. In this case, the rechargeable battery supplies power, and the first processing circuit converts the electrical signal provided by the rechargeable battery and charges the element with the resulting electrical signal.

While the preferred embodiments of the present invention have been described above, it should be noted that various modifications and improvements can be made by those skilled in the art without departing from the principle of the present invention. These modifications and improvements are to be encompassed by the scope of the present invention.

What is claimed is:

1. An electronic device, comprising:
   a main board;
   at least one element connected to the main board;
   a rechargeable battery;
   an adapter socket electrically connected to the at least one element;
   a first processing circuit having a first terminal electrically connected to the rechargeable battery, and a second terminal electrically connected to the adapter socket and the at least one element, the first processing circuit having a first operation state and a second operation state;
   a power supply judgment parameter acquisition module configured to acquire a power supply judgment parameter; and
   a control module configured to control the first processing circuit to operate in the first or second operation state based on the power supply judgment parameter,
   wherein:
   in the first operation state, the first processing circuit is configured to convert a first electrical signal output from a adapter connected to the adapter socket into a second electrical signal, and charge the rechargeable battery with the second electrical signal, while the adapter supplies power to the at least one element with the first electrical signal, and
   in the second operation state, the first processing circuit is configured to convert a third electrical signal output from the rechargeable battery into a fourth electrical signal, and supply power to the at least one element with the fourth electrical signal, and
   wherein
   the first processing circuit further has a third operation state, and operates in a third operation state when the adapter provides a fifth electrical signal having a voltage higher than that of the first electrical signal, and
   in the third operation state, the first processing circuit is configured to convert the fifth electrical signal output from the adapter into the second electrical signal, and charge the rechargeable battery with the second electrical signal, and the adapter supplies power to the at least one element with the fifth electrical signal.

2. The electronic device of claim 1, wherein the control module is configured to control the first processing circuit to operate in the first operation state when the power supply judgment parameter indicates that the adapter supplies power and the rechargeable battery needs to be charged, and to control the first processing circuit to operate in the second operation state when the power supply judgment parameter indicates that the rechargeable battery supplies power.

3. The electronic device of claim 1, wherein the control module is configured to control the first processing circuit to operate in the first or third operation state based on a voltage of the electrical signal provided by the adapter, when the power supply judgment parameter indicates that the adapter supplies power, and the rechargeable battery needs to be charged, and to control the first processing circuit to operate in the second operation state when the power supply judgment parameter indicates that the rechargeable battery supplies power.

4. The electronic device of claim 1, wherein the voltage of the first electrical signal is the same as that of the fourth electrical signal.

5. The electronic device of claim 1, wherein the voltage of the fourth electrical signal is higher than a discharging voltage of the rechargeable battery.

6. The electronic device of claim 1, wherein the voltage of the first electrical signal is lower than an upper limit of a charging voltage of the rechargeable battery.

7. The electronic device of claim 1, wherein the voltage of the fourth electrical signal is a first voltage and the at least one element comprises a first element operating at a second voltage different from the first voltage, and the electronic device further comprises:
   a first voltage conversion module configured to convert the electrical signal output from the adapter or the fourth electrical signal into a sixth electrical signal having the second voltage, the first voltage conversion module having a first terminal connected to the second terminal of the first processing circuit and the adapter socket, and a second terminal connected to the first element.

8. The electronic device of claim 1, wherein the voltage of the fourth electrical signal is a first voltage and the at least one element comprises a first element operating at a second voltage different from the first voltage, and the electronic device further comprises:
   a second voltage conversion module configured to convert the electrical signal output from the adapter or the third electrical signal into a sixth electrical signal having the second voltage, the second voltage conversion module having a first terminal connected to the rechargeable battery and the adapter socket, and a second terminal connected to the first element.

9. The electronic device of claim 1, wherein the first processing circuit comprises:
   a first resistor, an inductor, a diode, a capacitor and a second resistor sequentially connected in series, the first resistor being electrically connected to a line connected with an anode of the adapter, the second resistor being electrically connected to a line connected with a cathode of the adapter, and a series circuit of the capacitor and the second resistor being connected in parallel with the rechargeable battery; and
   a field effect transistor (FET) having a drain connected between the inductor and the diode, and a source connected to the second resistor and electrically connected to the line connected with the cathode of the adapter,
   wherein the control module is connected to the gate and the source of the FET and configured to control an operation parameter of the FET, such that the first processing circuit converts the first electrical signal output from the adapter or the third electrical signal output from the rechargeable battery.

10. The electronic device of claim 1, wherein
    the first processing circuit further has a fourth operation state, the control module is further configured to control the first processing circuit to operate in the fourth operation state when the power supply judgment parameter indicates that the adapter supplies power, and the electronic device has a load exceeding a predetermined threshold, and in the fourth operation state, the first processing circuit is configured to convert the third electrical signal output from the rechargeable battery into the fourth electrical signal, and supply power to the at least one element by using the fourth electrical signal in cooperation with the electrical signal provided by the adapter.

11. A power supply control chip in an electronic device provided with a first processing circuit and a rechargeable battery, the power supply control chip comprising:

a parameter collection module configured to collect a power supply state of an adapter and a voltage of the rechargeable battery; and a control module configured to control the first processing circuit to operate in a first operation state or a second operation state based on the power supply state of the adapter and the voltage of the rechargeable battery, wherein in the first operation state, the first processing circuit is configured to convert a first electrical signal output from the adapter into a second electrical signal, and charge the rechargeable battery with the second electrical signal, and the adapter supplies power to at least one element with the first electrical signal, and in the second operation state, the first processing circuit is configured to convert a third electrical signal output from the rechargeable battery into a fourth electrical signal, and supply power to the at least one element with the fourth electrical signal, and wherein the first processing circuit further has a third operation state, and operates in the third operation state when the adapter provides a fifth electrical signal having a voltage higher than that of the first electrical signal, and in the third operation state, the first processing circuit is configured to convert the fifth electrical signal output from the adapter into the second electrical signal, and charge the rechargeable battery with the second electrical signal, and the adapter supplies power to the at least one element with the fifth electrical signal.

12. A power supply control method in an electronic device provided with a first processing circuit and a rechargeable battery, the power supply control method comprising:

collecting a power supply state of an adapter and a voltage of the rechargeable battery; and controlling the first processing circuit to operate in a first operation state or a second operation state based on the power supply state of the adapter and the voltage of the rechargeable battery, wherein in the first operation state, the first processing circuit is configured to convert a first electrical signal output from the adapter into a second electrical signal, and charge the rechargeable battery with the second electrical signal, and the adapter supplies power to at least one element with the first electrical signal, and in the second operation state, the first processing circuit is configured to convert a third electrical signal output from the rechargeable battery into a fourth electrical signal, and supply power to the at least one element with the fourth electrical signal, and wherein the first processing circuit further has a third operation state, and operates in the third operation state when the adapter provides a fifth electrical signal having a voltage higher than that of the first electrical signal, and in the third operation state, the first processing circuit is configured to convert the fifth electrical signal output from the adapter into the second electrical signal, and charge the rechargeable battery with the second electrical signal, and the adapter supplies power to the at least one element with the fifth electrical signal.

\* \* \* \* \*